3,190,756
PROTOPECTIN COMPOSITIONS AND METHODS OF MAKING THE SAME
Walter Aurell, deceased, late of Orangeburg, N.Y., by Josephine Aurell, executrix, Kings Highway, Orangeburg, N.Y.
No Drawing. Filed Jan. 4, 1963, Ser. No. 249,528
13 Claims. (Cl. 99—90)

This invention relates to protopectin compositions and to methods of making protopectin compositions which are useful for incorporating into food products such as bakery products and as a diet supplement. The invention further includes food products and particularly bakery products containing the protopectin compositions produced according to this invention.

The beneficial properties of protopectin as a food component or as a food supplement has been known for many years. Protopectin when eaten and mixed with the saliva of the mouth swells in the stomach giving a feeling of fullness and in this way aids in diet-control. Protopectin also breaks down in the digestive tract into pectins, pepsins and fibrous materials and also provides or maintains intestinal regularity. In order to obtain the benefits of protopectin, it must, of course, be eaten. If dry protopectin in the solid or powder state is eaten directly, it mixes with the saliva in the mouth, becomes gummy and sticky and is thus unpalatable and difficult to swallow.

A number of attempts have been made to render protopectin more palatable and to prevent the formation of a sticky gum in the mouth such as placing the protopectin in capsules and the blending of protopectin in various food products such as bread, cookies, crackers and other bakery items.

When consumed in capsule form, however, protopectin becomes a gummy ball in the stomach which does not readily disperse. In this form in the stomach, its water absorbent properties are too low to be of significant value as a reducing aid or as a bile regulator.

Regardless of the usefulness of protopectin consumed in a capsule, it would be very advantageous to blend or incorporate protopectin in food products such as bread, cookies, crackers or other bakery items. Such a food product, if it could be prepared containing a significant amount of protopectin, would not only produce the beneficial results of a diet and bowel regulator but would be more palatable and permit the consumer to indulge in the delicacy of bakery products having a substantially reduced caloric content.

When protopectin is mixed with bakery doughs or mixes used to prepare bread, cookies, crackers, and so forth, it rapidly absorbs the water used to form the dough or mix and hardens the dough or mix, or causes it to become rubbery, within a relatively short period of time. This hardening action of protopectin necessitates the immediate shaping or baking of dough or mixes into which protopectin has been incorporated and renders the use of protopectin impractical from a commercial standpoint. In addition, even if such products are immediately shaped and baked, the baked products are generally hard, dense, and unpalatable.

Prior attempts to treat protopectin with substances to prevent this water absorption and hardening of the bakery mixes have been unsuccessful for various reasons. In some instances, the material used to treat the protopectin has required process conditions which are injurious to the protopectin while in other instances, the material used was not suitable for consumption. A further disadvantage of prior protopectin compositions is that they retarded the rising of the dough even in cases where the dough contained a normal, or more than normal, amount of rising agents which added to the poor texture and palatability of the product.

The protopectin compositions of this invention comprise finely divided protopectin particles having the surfaces of the particles substantially coated with a mixture of a vegetable oil comprising a mixture of monoglycerides and diglycerides and an inert thickening or bulking material in a sufficient amount to render the protopectin composition as a whole, substantially hydrophobic or water-repellant. The protopectin compositions of this invention also comprises finely divided protopectin particles in which the protopectin particle surfaces are substantially coated with a substantially uniform mixture of an edible hydrophobic material (advantageously a glyceride vegetable oil comprising a mixture of monoglycerides and diglycerides), a non-toxic edible thickening or bulking agent and a rising agent.

The coated protopectin compositions produced according to this composition can be incorporated into conventional bakery or dough mixes to produce bread, cookies, crackers and other bakery products using conventional mixing procedures and scheduling and without using any special techniques or steps. The coated protopectin compositions are merely substituted for a corresponding amount of ordinary flour, or added, as desired. For example, the coated protopectin can be sifted into the bakery mix together with the flour, or separately, as desired.

The coated protopectin compositions of this invention are, when dried, free flowing and stable. They can be stored for extended periods of time without adverse effects when subsequently used.

The use of the coated protopectin compositions of this invention in bakery products such as bread also significantly aids in maintaining the freshness of the bakery products for longer periods of time under ordinary storage conditions than previously experienced.

The protopectin compositions of this invention are prepared by contacting the protopectin particles and intimately mixing therewith an edible hydrophobic composition in the form of an emulsion. The hydrophobic composition is an edible fatty oil and advantageously a pure vegetable oil comprising a mixture of monoglyceride and diglyceride oils. The hydrophobic substances can be formed into emulsions by known means.

The mixed monoglyceride-diglyceride pure vegetable oils, for example, can be readily formed into aqueous emulsions by heating a mixture of the mixed glyceride oil with water to approximately 160° F. and thoroughly mixing the glyceride oil and water at this temperature in a Waring Blendor or a Hobart mixer until a smooth or adequate emulsion is formed.

The bulking or thickening agent can be mixed with the vegetable oil in various manners. A mixture of the glyceride oil and the thickening agent can readily be prepared by forming an emulsion of the glyceride oil with water, as above described, and thoroughly mixing therewith a solution or a suspension of the thickening agent. A solution of a thickening agent such as starch can readily be prepared by mixing the starch with water, bringing the starch-water mixture to a boil for sufficient time to form a starch-water solution which can be added directly to the vegetalble oil emulsion.

This mixed glyceride-thickening agent emulsion can then be directly mixed with a suitable amount of protopectin particles so as to thoroughly coat the particles with the mixture and then dried to produce a finely divided free-flowing coated protopectin composition.

A particularly advantageous protopectin composition of this invention comprises protopectin particles coated with a mixture of an edible hydrophobic composition and a rising agent. Such a product can be prepared by forming a vegetable oil-water emulsion, as described herein, cooling the glyceride emulsion to below the heat-reacting temperature of the rising agent and thoroughly mixing the rising agent with the glyceride emulsion. This emulsion can then be mixed with the protopectin compositions and the protopectin particles coated with the mixture of the hydrophobic material and the rising agent.

In producing the protopectin composition having the protopectin particles coated with a mixture of a hydrophobic substance and a rising agent, it is also advantageous to incorporate a thickening agent in the glyceride emulsion prior to the addition of the rising agent so that a product is produced in which the protopectin particles are coated with a mixture of a hydrophobic substance, a rising agent and a thickening agent, such as starch.

The protopectin compositions of this invention containing a rising agent admixed wth the coating are especially advantageous and when used to produce bakery products the bakery products having significantly improved plasticity, palatability, texture, appearance and volume. Prior protopectin compositions have actually retarded the rising action of bakery mixes or doughs both during the baking and prior thereto resulting in dense unpalatable products even though the normal amount of yeast or rising agents were used in the bakery mix with the protopectin.

Protopectin has been known for many years. It is commercially available and prepared in a dry state in various forms. Protopectin is derived from fruit and its composition will differ somewhat depending upon the fruit from which it is extracted, the condition of the fruit at the time of extraction, the method used for extracting the protopectin, purification methods employed, and so forth.

The skins of citrus fruits are the major source of protopectins and it is a feature of this invention that many different types of protopectins can be readily and easily coated and prepared for bakery use regardless of the source of the protopectin. For example, protopectin derived from the skins of oranges, lemons, limes, and so forth, can readily be used. Relatively impure protopectin can also be used. Protopectins, however, do vary somewhat in their ability to absorb water and particularly from a buffer solution having a pH of around 6, or the pH of the stomach, and it is advantageous to select a protopectin which will adsorb above 17, preferably about 17–24 cc., of buffered water at a pH of about 5.5 within a two hour period with periodic stirring. Generally, protopectin is commercially available at about a 40–60 mesh average size but both lower and higher mesh materials, such as 100 mesh can also be used.

Various thickening or bulking agents can be used according to the invention. Starch and protopectin itself have been found to be most advantageous and 200 mesh protopectin particularly so.

The hydrophobic substances which can be used according to this invention include glyceride vegetable oils and particularly pure mixed monoglyceride-diglyceride vegetable oils. Other equivalent hydrophobic materials can, of course, be employed and formed into an emulsion together with a thickening agent and/or a rising agent for application to protopectin particles so long as the hydrophobic materials are edible, non-toxic and have sufficient physical properties to withstand the processing conditions necessary for the particular hydrophobic substance employed.

Various rising or leavening agents can also be used according to this invention. Many rising agents are well known to those skilled in the art such as monobasic calcium phosphate and ordinary baking powders commercially available. The rising agent is preferably one which will not be activated at room temperature but only upon exposure to heat such as occurs in an oven during baking.

It is particularly advantageous to use mixed rising agents.

It is also advantageous to add a bicarbonate such as sodium bicarbonate to the hydrophobic glyceride oil emulsion mixture containing the thickening material and leavening agent after most of the water has been removed or absorbed by the protopectin which is being coated. If too much water is present during mixing of the bicarbonate with the protopectin emulsion mixture, the bicarbonate will react with water and its activity will correspondingly be reduced during the final baking stages.

The use of a 200 mesh protopectin as a thickening or bulking agent with the vegetable oil emulsion for coating protopectin has been found to be particularly advantageous both from a process and a product standpoint. When using a 200 mesh protopectin, an emulsion of the 200 mesh protopectin can readily be formed using the total amount of water required and the glyceride oil directly mixed with the 200 mesh protopectin emulsion. Forming the coating emulsion in this manner eliminates the necessity of forming the emulsion in two steps as is necessary with the use of starch or a lower mesh protopectin as a thickening or bulking agent. A protopectin emulsion can be formed by merely mixing the 200 mesh protopectin with water and heating the mixture to about 180–190° F. and holding it there for about 10 or 15 minutes. When a 200 mesh protopectin emulsion is so formed, the protopectin appears to break down and form a homogenous composition to which the glyceride oil can be added directly.

The amount of hydrophobic substance, such as a pure vegetable oil, admixed with the thickening or bulking agent and/or with the leavening agent will vary depending upon the particular emulsion used as well as upon the particular protopectin to be coated. It is thus not possible to define the amount within particular limits but the amount should be sufficient to render the protopectin composition as a whole, hydrophobic so as to prevent any significant absorption of water by the protopectin during the mixing and kneading operations preliminary to baking so as to prevent hardening of the dough or bakery product.

When a rising agent is employed in the coating of the protopectin particles, the amounts can also vary depending upon the amount of rising desired in the final product and is generally comparable with the amount of rising agent which would normally be used by those skilled in the art in conventional bakery mixes or doughs.

The amount of thickening or bulking agent used with the glyceride oils can also be varied quite widely. This amount, of course, will vary with the particular bulking agent used as well as with the mesh of the bulking agent used, and so forth. Generally, the amount of bulking agent should be sufficient to render the emulsion of a creamy consistency. Obviously, if the amount of bulking agent is high, the emulsion will be quite thick and difficult to disperse and mix with the protopectin particles. Similarly, if the amount of bulking agent is low, the protopectin particles will tend to absorb the water from the emulsion.

Examples of particular proportions of the various ingredients are set forth below in the specific working examples.

The use of emulsions to coat protopectin particles according to this invention makes it much easier to coat the particles without using any adverse conditions, such as high temperatures which might adversely affect the color, taste, or other properties of the protopectin. The emulsion process also results in the coating of a higher percentage of the particles as well as an improved uniformity of the coating.

The following examples illustrate various manners by which the invention can be practiced.

*Example 1*

160 cc. of water is heated to approximately 160° F. 68 grams of a glyceride oil comprising a mixture of monoglyceride and diglyceride vegetable oils are also heated to approximately 160° F. The heated glyceride oil and water are then thoroughly mixed in a Waring Blendor to form an emulsion.

A starch solution is then prepared by mixing 10 grams of starch with 350 cc. of water. The mixture is boiled for a sufficient time to form a starch-water solution. The starch solution is cooled to about 90° F. and thoroughly mixed together with the glyceride emulsion.

The glyceride-starch emulsion is then cooled to about 110° F. and 29 grams of a mixed rising agent is then added to the glycerine-starch emulsion.

30 grams of the glyceride-starch emulsion containing the rising agent is then thoroughly mixed with 300 grams of protopectin together with 1.38% sodium bicarbonate based upon the total weight of the emulsion and the protopectin. A small amount of a fine silica is also added during the mixing of the protopectin and the sodium bicarbonate.

After the protopectin and the bicarbonate are thoroughly mixed with the glyceride-starch emulsion, the mixture is placed on a drying rack above an oven and a small amount of silica is sprinkled over the mixture and the mixture dried at 150° F. The amount of silica used is very small being only a fraction of a percent by weight of the components mixture on a dry basis. The mixture is allowed to air dry at 150° F. for approximately 5 to 10 minutes.

The resulting product is similar in consistency to ordinary flour. It flows freely and has a very light tan color. The product produced in this example consisted of particles of protopectin having a substantial portion of the particles coated substantially uniformly with a mixture of starch, glyceride oil, rising agent and sodium bicarbonate. The coating is hydrophobic and the composition as a whole is thus substantially water-repellant.

A baking mix is prepared using the coated protopectin composition of this example and the following ingredients:

| Ingredient | Amount |
| --- | --- |
| Malt | 2½ oz. |
| Salt | 2½ oz. |
| Sugar | 7½ oz. |
| Vegetable oil | 7½ oz. |
| Yeast (brewers) | 8 oz. |
| White flour | 2 lbs. 8 oz. |
| Gluten flour | 3 lbs. 2 oz. |
| Coated protopectin (as prepared in this example) | 14 oz. |
| Mixed monoglyceride and diglyceride oil | ½ oz. |

The baking mix ingredients are mixed by conventional procedures together with a sufficient amount of water to form a dough suitable for baking. The coated protopectin can be sifted into the mixture separately as the dough is started or it can be sifted in with the flour.

The dough was placed into pans of a size to give approximately 18 oz. loaves of bread and baked in an oven with steam at 400° F. for approximately 23 minutes.

Example 2

35 grams of 100 mesh protopectin are thoroughly mixed with 700 cc. of cold water. The protopectin suspension is then heated to boiling and the suspension thoroughly mixed in a Hobart mixer to form a smooth emulsion.

320 cc. of water are then heated to approximately 160° F. 136 grams of a pure vegetable glyceride oil comprising a mixture of monoglyceride and diglyceride vegetable oils are also heated to approximately 160° F. and the glyceride oil and water thoroughly mixed in Waring Blendor to form a smooth emulsion.

The protopectin emulsion is then cooled to about 160° F. and thoroughly mixed together with the glyceride oil emulsion. The glyceride-protectin emusion is then cooled to about 80° F. and 58 grams of a mixed rising agent together with 31.25 grams of calcium propionate are then added to the glyceride-protopectin emulsion.

110 grams of glyceride-protopectin emulsion is then thoroughly mixed with 395 grams of protopectin powder derived from orange skins. The glyceride-protopectin emulsion is mixed with the protopectin until it is almost in the dry stage and at this point, 6 grams of sodium bicarbonate (1½% total weight of the mixture) are added and mixed therein. After the protopectin and bicarbonate are thoroughly mixed with the glyceride-protopectin emulsion, this mixture is placed on a drying rack above the oven and a small amount of silica is sprinkled over the mixture and the mixture dried at 150° F. for approximately 5 to 10 minutes.

The resulting product is of very similar consistency to ordinary flour. It flows freely and has a very light tan color. The product produced in this example consisted of particles of protopectin having a substantial portion of the particles coated substantially uniformly with a mixture of protopectin, glyceride oil, rising agent and calcium propionate and also having sodium bicarbonate admixed therewith. The mixture is hydrophobic and the composition as a whole is thus substantially water-repellant.

A baking mix is prepared using the coated protopectin composition of this example in the same manner and using the same ingredients as set forth in Example 1 with the only exception being the substitution of 14 oz. of the coated protopectin of this example for the coated protopectin of Example 1.

The dough was placed in the pans of a size to give approximately 8 oz. loaves and baked in an oven with steam at 400° F. for approximately 23 minutes.

Example 3

35 grams of 200 mesh protopectin are dispersed in 800 cc. of water. The dispersion is then heated to approximately 180–190° F. and held at this temperature for 10 to 15 minutes and the protopectin thoroughly mixed therein to form a smooth emulsion and homogenous composition. 180 grams of a pure vegetabl glyceride oil comprising a mixture of monoglyceride and diglyceride vegetable oils are heated to approximately 160° F. and directly added and thoroughly dispersed in the protopectin emulsion at a temperature of about 160° F.

The glyceride-protopectin emulsion was then cooled to about 80° F. and 58 grams of a mixed rising agent together with 31.25 grams of calcium propionate are then added to the glyceride-protopectin emulsion and thoroughly dispersed therein.

110 grams of the glyceride-protopectin emulsion is then thoroughly mixed with 395 grams of protopectin powder derived from orange skins. After the protopectin-glyceride emulsion-protopectin mixture has become substantially dry, 6 grams of sodium bicarbonate are dispersed therein and the mixture placed on a drying rack above an oven, a small amount of silica is sprinkled over the mixture, and the mixture is dried at 150° F. for approximately 5 to 10 minutes.

The resultant product is very similar in consistency to flour and flows freely and has a very light tan color. The product produced according to this example consisted of particles of protopectin having a substantial portion of the particles coated substantially uniformly with a mixture of 200 mesh protopectin-glyceride oil, rising agent and calcium propionate and also having sodium bicarbonate admixed therewith. The composition is hydrophobic and repels water.

A baking mix is prepared using the coated protopectin composition used according to this example in the same manner and using the same ingredients as set forth in Example 1 with the exception that 14 oz. of the protopectin produced according to this example are substituted for the coated protopectin of Example 1.

The prepared dough was placed in the pans of a size to give approximately 18 oz. loaves of bread and baked in an oven with steam at 400° F. for approximately 23 minutes.

The loaves of bread produced according to the above examples had excellent volume, substantially the same as would be expected by using ordinary flour in place of the coated protopectin and substantially the same amount of rising agents. The presence of the protopectin in the baking mix did not inhibit the rising action. The texture of the bread was excellent and substantially uniform. The flavor was also excellent. The loaves of bread, when stored for periods of one to two weeks wrapped in an ordinary cellophane wrapper, remained substantially as fresh as they were soon after baking. The bread also contained about one-half the caloric content of bread made using similar ingredients but without the protopectin.

What is claimed is:

1. A composition comprising protopectin particles having the surfaces thereof coated with an effective amount of a substantially uniform mixture of (1) a thickening agent selected from at least one member of the group consisting of starch and protopectin and (2) an edible hydrophobic vegetable oil.

2. A composition of claim 1 in which the particle size of the protopectin thickening agent is greater than 100 mesh.

3. A composition according to claim 1 in which the vegetable oil is a relatively pure mixture of monoglycerides and diglycerides.

4. A composition comprising protopectin particles having the surfaces thereof coated with an effective amount of a material comprising a leavening agent in admixture with an edible hydrophobic substance.

5. A composition according to claim 4 in which the hydrophobic substance is a vegetable oil.

6. A composition according to claim 5 in which the coating material also includes a thickening agent selected from at least one member of the group consisting of starch and protopectin.

7. A composition according to claim 6 in which the particle size of the protopectin is in excess of 100 mesh.

8. A composition according to claim 6 which also has a nontoxic bicarbonate in admixture therewith.

9. The process of making a coated protopectin composition which comprises forming an emulsion of an edible hydrophobic vegetable oil together with a thickening agent selected from at least one member of the group consisting of starch and protopectin to form an emulsion of a creamy consistency, thoroughly mixing the emulsion with protopectin particles to deposit the mixed vegetable oil and thickening agent on the particles and drying the mixture to form protopectin particles having a vegetable oil thickening agent mixture coated thereon.

10. The process of forming coated protopectin compositions which comprises forming an emulsion of an edible hydrophobic composition, mixing with the emulsion a leavening agent, mixing the emulsion containing the leavening agent with protopectin particles to form a coating thereon containing the hydrophobic substance and the leavening agent and drying the composition to form a free-flowing protopectin composition in which the coating comprises a leavening agent in mixture with the hydrophobic composition.

11. The process of claim 10 in which thickening agent selected from at least one member of the group consisting of starch and protopectin is also admixed with the emulsion.

12. The process of forming coated protopectin compositions which comprises forming an aqueous emulsion of a 200 mesh protopectin, directly adding to the protopectin emulsion a hydrophobic vegetable oil to form a mixed vegetable oil-protopectin emulsion, mixing the emulsion with protopectin particles to form a coating on the protopectin particles and thereafter drying the mixture to form a free-flowing dry product in which the particles are coated with a mixture of protopectin and a vegetable oil.

13. The process of claim 12 in which a leavening agent is also added to the vegetable oil-protopectin emulsion.

References Cited by the Examiner

UNITED STATES PATENTS

| | | | |
|---|---|---|---|
| 2,623,825 | 12/52 | Tressler | 99—94 |
| 2,865,757 | 12/58 | Aurell | 99—92 |
| 2,952,548 | 9/60 | Work | 99—90 |

A. LOUIS MONACELL, *Primary Examiner.*